United States Patent
Aggarwal et al.

(10) Patent No.: US 7,489,643 B2
(45) Date of Patent: Feb. 10, 2009

(54) INCREASED AVAILABILITY ON ROUTERS THROUGH DETECTION OF DATA PATH FAILURES AND SUBSEQUENT RECOVERY

(75) Inventors: Amit Kumar Aggarwal, San Jose, CA (US); Shrinath Honnavalli, Fremont, CA (US); Ashok Kumar, San Jose, CA (US); Venkatesh Dattathri, Santa Clara, CA (US); Sahil Chander Bhardwaj, Haryana, IN (US); Sumeet Knmar Arora, San Jose, CA (US); Nimish Bhatt, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 883 days.

(21) Appl. No.: 10/941,521

(22) Filed: Sep. 14, 2004

(65) Prior Publication Data

US 2006/0056303 A1 Mar. 16, 2006

(51) Int. Cl.
*H04L 1/22* (2006.01)
*H04J 3/14* (2006.01)
*G06F 11/00* (2006.01)
*G08C 25/02* (2006.01)

(52) U.S. Cl. .................. 370/248; 370/217; 370/242; 370/249

(58) Field of Classification Search .......... 370/216–218, 370/242, 244, 248–249
See application file for complete search history.

(56) References Cited

U.S. PATENT DOCUMENTS

| | | | | |
|---|---|---|---|---|
| 5,956,370 | A * | 9/1999 | Ducaroir et al. | 375/221 |
| 6,404,740 | B1 * | 6/2002 | Yoshida | 370/241.1 |
| 6,424,629 | B1 * | 7/2002 | Rubino et al. | 370/241.1 |
| 6,879,559 | B1 * | 4/2005 | Blackmon et al. | 370/225 |
| 7,010,715 | B2 * | 3/2006 | Barbas et al. | 714/4 |
| 7,099,271 | B2 * | 8/2006 | Friesen et al. | 370/218 |
| 7,126,921 | B2 * | 10/2006 | Mark et al. | 370/242 |
| 7,233,568 | B2 * | 6/2007 | Goodman et al. | 370/218 |
| 7,240,364 | B1 * | 7/2007 | Branscomb et al. | 726/9 |
| 7,292,535 | B2 * | 11/2007 | Folkes et al. | 370/238 |
| 7,317,731 | B2 * | 1/2008 | Seddigh et al. | 370/419 |
| 2002/0099972 | A1 * | 7/2002 | Walsh et al. | 714/10 |
| 2003/0120822 | A1 * | 6/2003 | Langrind et al. | 709/251 |
| 2003/0193890 | A1 * | 10/2003 | Tsillas et al. | 370/216 |
| 2003/0198221 | A1 * | 10/2003 | Kim et al. | 370/389 |
| 2003/0210705 | A1 * | 11/2003 | Seddigh et al. | 370/419 |
| 2005/0050136 | A1 * | 3/2005 | Golla | 709/200 |
| 2005/0099955 | A1 * | 5/2005 | Mohan et al. | 370/242 |
| 2005/0105462 | A1 * | 5/2005 | Belotti et al. | 370/216 |
| 2005/0243732 | A1 * | 11/2005 | Bitar et al. | 370/241.1 |

* cited by examiner

*Primary Examiner*—Chi H Pham
*Assistant Examiner*—Ahmed Elallam
(74) *Attorney, Agent, or Firm*—Stolowitz Ford Cowger LLP (57) ABSTRACT

Methods and systems for monitoring a data path on a network routing device are described. The data path includes a plurality of devices on the network routing device and an interface. Data packets are moved on the network routing device using the devices and communicated to and from a network via the interface. A process for detecting a defective device on the network routing device is executed. The process is a self-contained process that is executed within the data path, allowing a defect in the data path to be detected, localized and recovered from.

39 Claims, 3 Drawing Sheets

INCREASED AVAILABILITY ON ROUTERS THROUGH DETECTION OF DATA PATH FAILURES AND SUBSEQUENT RECOVERY

TECHNICAL FIELD

Embodiments of the present invention pertain to failure detection in the data plane of a network routing device.

BACKGROUND ART

Contemporary high-speed routers are designed with multiple linecards that have separate control and data "planes." A data plane includes, for example, devices on a linecard that actually move data traffic, while a control plane handles control traffic. The data plane and the control plane include physically separate devices that can, however, communicate with each other if need be.

According to conventional art, "keep-alive" packets are exchanged between routing devices (e.g., linecards mounted in routers or switches) in order to verify the integrity and availability of the network. If, for example, a routing device does not receive keep-alive packets from another routing device for a period of time (the "timeout" interval), the first routing device presumes that the other routing device is out-of-service. Consequently, the first routing device implements routing protocols that reconfigure its routing tables so that the out-of-service routing device is bypassed. During the time it takes to implement the routing protocols and populate its routing tables, the availability of the first routing device is negatively affected. Moreover, this effect is experienced by other routing devices that also need to reconfigure their routing tables. In essence, the network needs to reconverge, finding new paths that bypass the out-of-service routing device. Thus, the effect of the out-of-service routing device can propagate through the network, turning a local failure into a network-wide event.

To improve reliability, higher-end routers/switches are equipped with a redundant (or standby) linecard for each primary (or active) linecard. Should the control plane of the primary linecard fail, for example, then a switch can be made to the redundant linecard. Some routers/switches support "hot standby" operation, in which the routing tables of the redundant linecard are updated when the routing tables of the primary linecard are updated, so that the routing tables of the two linecards are identical. Without hot standby operation, time and data can be lost while the routing tables of the redundant linecard are populated.

Routers/switches may also be equipped with online diagnostic capabilities, allowing them to run diagnostic tests and monitor the "health" of their linecards during operation. If, for example, a malfunction of some sort is suspected on a linecard, the diagnostics for the devices on the linecard can be reviewed. If the diagnostics indicate that a device is not functioning properly, then an attempt can be made to reset that device.

Thus, higher-end routers/switches can respond in the following manner to a potential problem with a linecard. If equipped with online diagnostic capabilities, then it may be possible to identify a device on the linecard that is not functioning up to par and reset that device. If not so equipped, or if the reset attempt is not successful, then a switch to a redundant linecard can be made. Switching to another linecard is facilitated when hot standby is supported, as described above. Note that if hot standby is supported, it may be better to just switch linecards even if the router/switch is equipped with online diagnostic capability.

A shortcoming of the conventional art is that there is no mechanism available for identifying a defect or failure that is local to the data plane on a linecard. Currently, a defect or failure in the data plane remains unidentified until a downstream person or device recognizes that expected data is not being received. This approach is unsatisfactory because it fails to localize the failure; that is, the failure may have occurred in any one of the many upstream network devices. Also, by the time the problem is recognized and the cause of the problem then pinpointed, too much time has passed. Not only may data continue to be lost, but routing protocols may timeout, as described above.

Alternatively, as mentioned above, the absence of keep-alive packets can also be used to indicate a potential router problem. While this approach may be helpful in localizing the cause of a failure, it does not adequately address the time issue. That is, by the time the keep-alive packets are able to identify a malfunctioning linecard, data can be lost and routing protocols may timeout.

Accordingly, a method and/or system that can more quickly identify a problem in the data plane of a routing device, more quickly localize the source of the problem, and attempt to resolve it soon enough to avoid reconvergences, would be advantageous. The present invention is a novel solution that provides these advantages.

SUMMARY OF THE INVENTION

Embodiments of the invention pertain to methods and systems for monitoring a data path (plane) on a network routing device (e.g., a linecard). The data path includes a plurality of devices on the routing device and an interface. Data packets are moved on the routing device using the devices and communicated to and from a network via the interface. A process for detecting a defective device in the data path on the routing device is executed. The process is a self-contained process that is executed within the data path, enabling detection and localization of and recovery from a defect in the data path. Because it operates locally, the process can more quickly identify a problem in the data path, more quickly localize the cause of the problem, and more quickly recover from the problem relative to conventional mechanisms.

In one embodiment, loop-back packets are used to detect a defective device in the data path on the routing device. In one such embodiment, a channel dedicated to the loop-back packets is programmed so that each loop-back packet is looped back to its source from the last device on the data path. The loop-back packets are periodically transmitted, and the source/destination monitored to determine whether the loop-back packets are being received. If one or more loop-back packets are not received, then there may be a defect in a device on the data path.

In another embodiment, with regular data flow through the interface, the interface can be monitored to determine whether data packets are flowing through the interface. In one such embodiment, the data packets flowing in through the interface are counted and the data packets flowing out through the interface are also counted. If the counts are not increasing with time, then there may be a defect in a device on the data path.

In yet another embodiment, the embodiments described above are implemented in combination. For example, loop-back packets can be used to detect a defect in a device on the data path and, if a potential defect is detected, then the interface can be checked to determine if data packets are flowing through the interface. By using one process embodiment to verify the conclusions of the other process embodiment, the potential for false alarms is reduced. Thus, the combination of process embodiments provides an advantage in addition to the advantages provided by the single process embodiments.

In one embodiment, if a potential defect is identified, the routing device enters into a self-recovery mode. For instance, online diagnostic tests of the devices on the data path can be performed to determine if any of those devices are not functioning properly. An attempt can then be made to reset any malfunctioning device.

Also, in one embodiment, a switch can be made to a redundant routing device (e.g., another linecard) if a potential defect is identified or if attempts to reset a potentially malfunctioning device are unsuccessful. To prevent repeated switching back and forth between the primary and redundant routing devices, the number of switches that are allowed in a specified time window can be limited. In one embodiment, the present invention process(es) for verifying the integrity of the data path on a linecard can be executed on the redundant linecard even if that linecard is not otherwise in service, in order to ensure that the redundant linecard is healthy enough to take over in case a failure is encountered on the primary linecard.

The present invention process, in its various embodiments, offers a generic approach that can be implemented on various types of network devices, such as but not limited to switches, routers, load balancers and firewalls. The present invention can be implemented in software without hardware modifications.

Embodiments of the present invention are particularly well-suited for devices that have separate planes for control and data traffic. Also, the process of the present invention, in its various embodiments, does not consume a significant amount of processing and bandwidth resources. Furthermore, because the location of a failure can be readily pinpointed as mentioned above, troubleshooting and recovery are facilitated. In addition, outages associated with timeouts of routing protocols can be avoided by checking for potential defects at intervals that are shorter than the timeout interval. Moreover, single points of failure in a routing device (e.g., a linecard) and outages that occur as a result can be avoided by integrating the present invention process with online diagnostic processes. Consequently, embodiments in accordance with the present invention can improve the availability of the routing device (e.g. the linecard), the device on which the linecard is mounted (e.g., a router or switch), and the network itself.

These objects and advantages of the present invention as well as others will be recognized by those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures and components have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed in computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system or similar electronic computing device (e.g., an intelligent device having computer-like functionality, such as a router or switch). It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "enabling" or "executing" or "moving" or "communicating" or "detecting" or "inserting" or "identifying" or "programming" or "accessing" or "performing" or "interfacing" or "implementing" or "reading" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
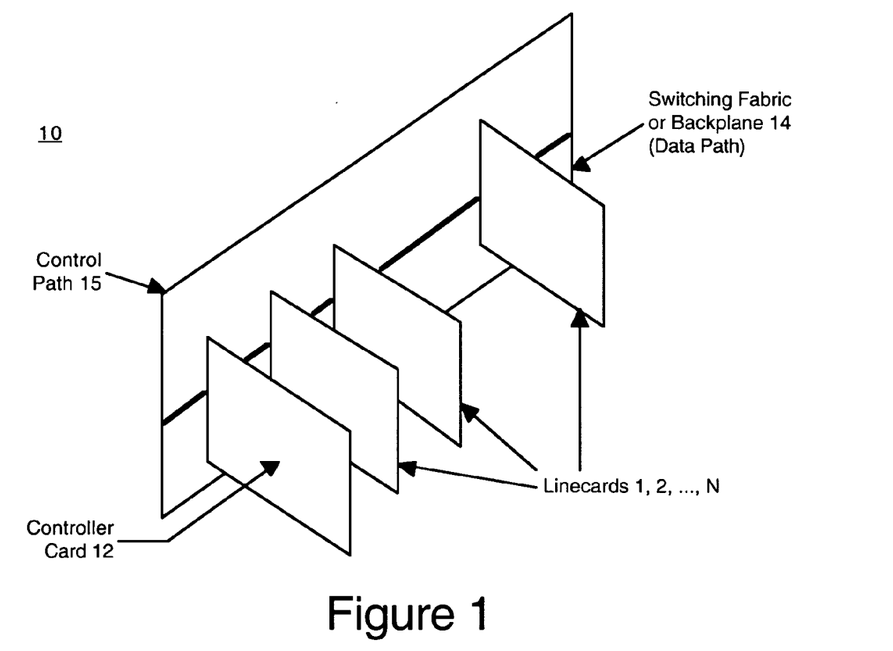
FIG. 1 is a perspective drawing showing elements of a router or switch upon which embodiments of the present invention may be implemented.

FIG. 1 is a perspective drawing showing elements of a system 10 upon which embodiments of the present invention may be implemented. In the example of FIG. 1, system 10 includes a controller card 12 and a number of linecards 1, 2, . . . , N that are coupled via a control path 15 and a data path (switching fabric or backplane 14). For instance, control path 15 and backplane 14 can be separate physical paths on a printed circuit board that has slots into which the linecards 1, 2, . . . , N are inserted. Linecards 1, 2, . . . , N can be printed circuit boards that include devices and components associated with their function as network routing devices. Controller card 12 can include a central processing unit and memory (e.g., random access memory), as well as other elements.

Elements such as linecards 1, 2, ..., N and controller card 12 are known in the art. System 10 can include elements other than those illustrated.

In general, system 10 is embodied as a router or as a switch that is coupled to (e.g., in communication with) other devices (e.g., other routers and switches as well as load balancers, firewalls, etc.) in a network. Devices such as routers and switches are known in the art of networking.

Figure 2:
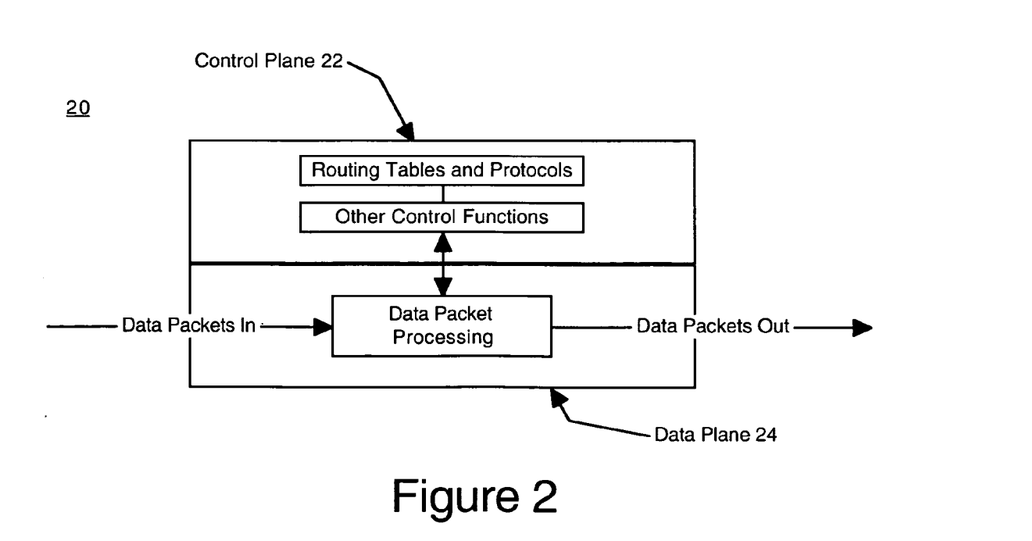
FIG. 2 is a block diagram of a linecard showing a data plane and a control plane according to one embodiment of the present invention.

FIG. 2 is a block diagram of a linecard 20 showing a control plane 22 and a data plane 24 according to one embodiment of the present invention. Control planes and data planes are physically separate sets of devices for control traffic and data traffic, respectively. The use of control planes and data planes in devices such as routers and switches is known in the art.

In general, control plane 22 performs functions such as synchronization and orchestration of events, control and management of device operation such as maintenance of routing tables, and execution of routing protocols.

In general, data plane 24 includes the devices that constitute the data path over which data traffic actually moves through the linecard 20. In addition to receiving and transmitting data packets, data plane 24 may perform some processing of data packets under control of the control plane 22. For example, processing tasks performed by data plane 24 may include queuing and scheduling of data packets, data parsing, and data packet fragmentation and reassembly.

Figure 3:
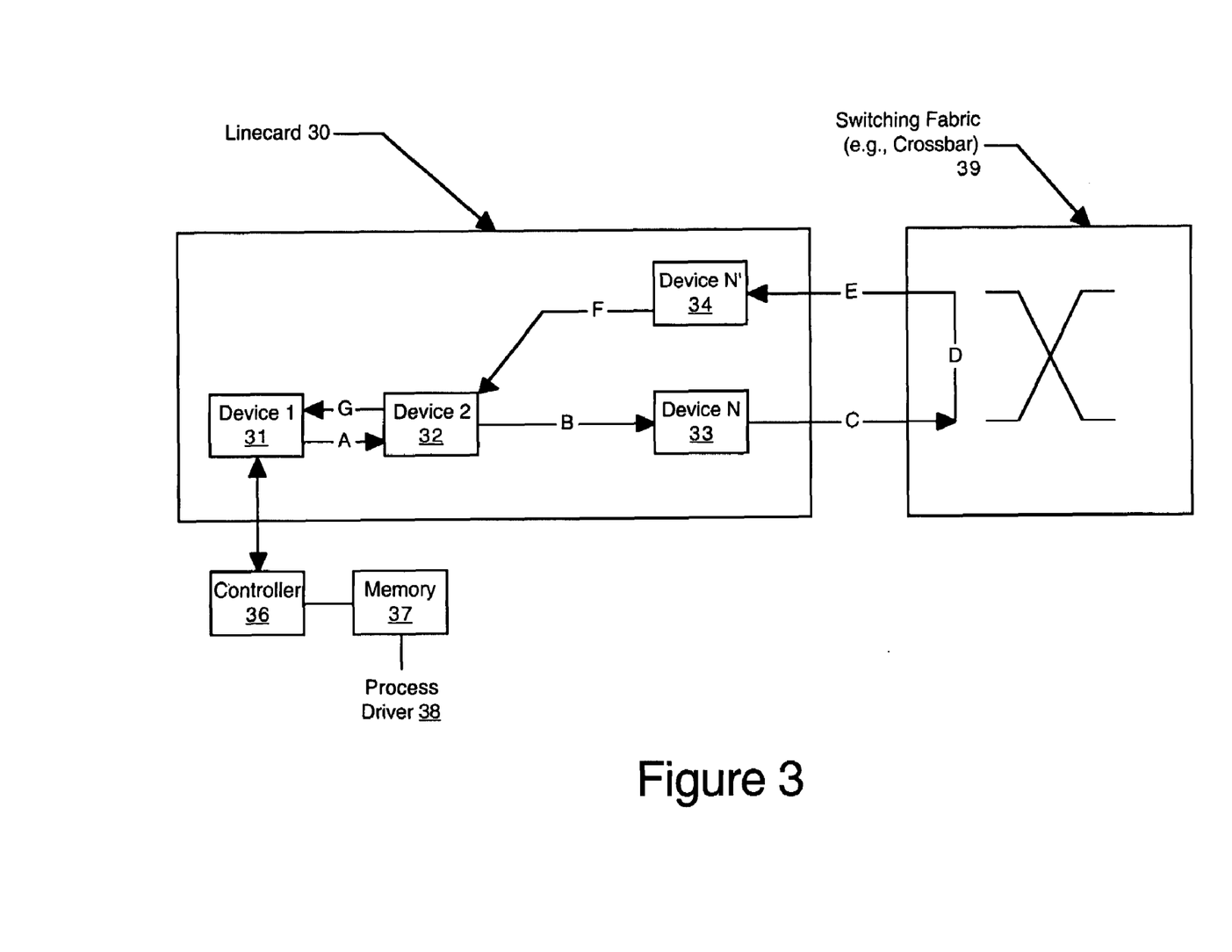
FIG. 3 is a block diagram of a linecard showing devices on a data path according to one embodiment of the present invention.

FIG. 3 is a block diagram of a network routing device (e.g., linecard 30) according to one embodiment of the present invention. In the example of FIG. 3, linecard 30 includes devices 31 (device 1), 32 (device 2), 33 (device N) and 34 (device N'). There may be other devices on linecard 30. In one embodiment, linecard 30 is installed on a router or switch with other linecards and with a controller card as illustrated by FIG. 1, although the present invention is not so limited.

Devices 31-34 of FIG. 3 form, at least in part, a data plane or path on linecard 30. Devices 31-34 of FIG. 3 can be, for example, application-specific integrated circuits (ASICs), field programmable gate arrays (FPGAs), network processors, or such devices. There may be other devices, and other types of devices, on the data path in addition to devices 31-34. Although four devices are illustrated, there may be any number of devices. When data is being sent, the data path includes, in order, devices 31, 32 and 33. When data is being received, the data path includes, in order, devices 34, 32 and 31.

In the example of FIG. 3, an interface 39 (e.g., a crossbar switch fabric) is coupled to (in communication with) the linecard 30. In one embodiment, the interface 39 and the linecard 30 are situated on the same chassis. Interface 39 can also be coupled to other linecards that may be present on the chassis.

According to embodiments of the present invention, a process is implemented in the data path on linecard 30 in order to detect a defective device in the data path. That is, the process, when executed, can identify a potential defect in any of the devices 31-34. The process can also be used to identify a fault in the interface 39.

In the example of FIG. 3, the process is implemented by controller 36 (e.g., a processor), which may reside either on a separate controller card (e.g., controller card 12 of FIG. 1) or on linecard 30. In the example of FIG. 3, the process is embodied as process driver 38, which resides in a computer-usable medium (e.g., memory 37) as computer-readable program code that is executed by controller 36. The memory 37 may reside either on a separate controller card (e.g., controller card 12 of FIG. 1) or on linecard 30. Importantly, embodiments in accordance with the present invention can be implemented in software within existing hardware configurations, and therefore can be readily incorporated not only into newer types of network devices but legacy network devices as well.

Thus, in one embodiment, the present invention process is self-contained within the linecard 30, while in another embodiment it is not. In general, the present invention process can be separately installed on each linecard, or it can be centrally located (e.g., on controller card 12). In the latter case, the present invention can be configured to execute on more than one linecard (e.g., either all linecards or on selected linecards).

With reference to FIG. 3, in one embodiment, the process for identifying a defective device in linecard 30 (more specifically, in the data path on linecard 30) is implemented as follows. In the present embodiment, a channel is programmed to function in a "loop-back" mode. That is, the channel is programmed so that its destination is the same as its source. Accordingly, a packet (referred to herein as a "loop-back packet") inserted on that channel and into the data path will loop back to its source. A loop-back packet is a particular type of packet used for verifying the integrity of the data path on linecard 30. To minimize overhead, a loop-back packet does not carry data.

As will be seen, a loop-back packet is different from a conventional keep-alive packet, in that a keep-alive packet is sent from one routing device to another while a loop-back packet remains local to a single routing device. In essence, a loop-back packet only traverses the data path of a single routing device, while a keep-alive packet traverses the data paths of multiple routing devices as well as the data paths of other network devices therebetween.

In the example of FIG. 3, a loop-back packet injected at device 31 is forwarded to device 32 (A), then to device 33 (B), through interface 39 and back to device 34 (C, D, E), back to device 32 (F) and finally back to device 31 (G). Note that the loop-back packet traverses the devices on the data path used for sending data packets (devices 31, 32 and 33) as well as the devices on the data path used for receiving data packets (devices 34, 32 and 31).

Loop-back packets can be inserted at various points along the data path of linecard 30, other than the first device of the data path. Also, loop-back packets can be continuously inserted into the data path at predefined time intervals. The interval at which loop-back packets are inserted can be advantageously set to be shorter than the timeout interval associated with routing protocols.

In the example of FIG. 3, the interface 39 is provided with the functionality to return the loop-back packets to their source. Alternatively, any device can be provided with that functionality (for example, device 32). In general, the last device in the outward portion of the data path (the portion of the data path in which the loop-back packet is traveling away from the source) that is coupled to both the transmit and receive paths is provided with the functionality to return a loop-back packet to its source. Another option is to include a device (not shown) that interfaces with both devices 33 and 34 and switching fabric 39 and that has the functionality to return the loop-back packets to their source.

Importantly, according to embodiments of the present invention, a loop-back packet can be distinguished from other packets and looped back to its source. That is, according to the embodiments of the present invention, not all packets are looped back to linecard 30. Thus, data packets can continue to be sent from linecard 30 (and received at linecard 30) in a conventional fashion even as the loop-back packets are being inserted into the data path.

The functionality to recognize and return loop-back packets, without looping back all packets, can be achieved in various ways. In one embodiment, as noted above, a channel dedicated to loop-back packets is programmed. Accordingly, there will be no traffic on that channel other than loop-back packets. Thus, all packets on the channel are automatically looped back to their source. In this embodiment, there is no need to read the packet to identify it as a loop-back packet.

In one embodiment, linecard 30 resides in an Asynchronous Transfer Mode (ATM) router or switch; that is, interface 39 is an ATM interface. ATM is a connection-oriented system in which each connection is identified by a combination of a Virtual Path identifier (VPI) and a Virtual Channel identifier (VCI). In an ATM embodiment, the channel dedicated to loop-back packets is identified using a unique VPI/VCI, and the channel destination is specified to be the same as the channel source.

The present invention is not limited to the use of an ATM interface. Other interfaces that may be used include, but are not limited to, a frame relay interface or a packet over SONET (Synchronous Optical Network) interface.

In another embodiment, a packet can be tagged in some manner to identify it as a loop-back packet. The last device in the outward portion of the data path (e.g., device 33 or interface 39) can read the packet (or a packet header, for example) to identify the packet as a loop-back packet, and then forward (loop back) the packet to device 34 instead of to the network.

In the present embodiment, a potential defect or failure on the data path in linecard 30 is identified when a loop-back packet is not returned to its source. Conversely, the integrity of the data path is verified each time a loop-back packet returns to its source.

Various techniques can be used to detect the return of a loop-back packet to the source. For example, a bit flag can be set to indicate that a loop-back packet has been sent, and the flag can be reset (toggled) to indicate that a loop-back packet has returned.

As noted above, loop-back packets can be sent out at intervals to continually verify the integrity of the data path on linecard 30. It is not necessary for one loop-back packet to return before another loop-back packet is sent. A counter can be incremented each time a loop-back packet is sent and decremented each time a loop-back packet returns. Alternatively, different counters can be used, one to count the number of loop-back packets sent and another to count the number of loop-back packets returned. If the difference between the number of loop-back packets sent and the number returned exceeds a predefined threshold value (which may be one or more than one), a potential problem on the data path is identified.

Another embodiment of the present invention uses an alternative to loop-back packets to identify a potential failure on the data path of linecard 30. In the alternative embodiment, a determination is made as to whether data packets are flowing in and out through interface 39. In one embodiment, a count is made of the number of data packets that have been sent out from linecard 30 through interface 39, and a count is also made of the number of data packets that have been received by linecard 30 through interface 39. If both counts increase with time, the integrity of the data path on linecard 30 is verified. However, if either or both counts do not increase with time, a potential problem on the data path is identified. The effectiveness of this approach is increased when there is regular data flow through the interface.

Thus, in one embodiment, loop-back packets are used to verify the integrity of the data path on linecard 30. In another embodiment, the flow of data packets through interface 39 is monitored. Note that these two embodiments can be used in combination in order to prevent or reduce false alarms. That is, one approach can be used to verify the results of the other approach. For example, if a loop-back packet does not return to its source, the counts of data packets sent and received can be accessed to determine if data packets are flowing properly. Alternatively, if the number of data packets sent and received is not increasing with time, a loop-back packet can be inserted into the data path. By reducing the number of false alarms, using a combination of the two approaches provides another advantage in addition to the advantages provided by either one of the approaches.

In one embodiment, in response to identifying that there is a potential defect in the data path of linecard 30, the linecard can be taken out-of-service. In network devices which utilize redundant (standby) linecards, a switch can be made from linecard 30 to another linecard. Importantly, in either case, the problem with the data path on linecard 30 is quickly identified, allowing corrective actions to be initiated before significant data is lost. Note that the present invention process(es) for verifying the integrity of the data path on a linecard can be executed on the redundant linecard even if that linecard is not otherwise in service. The intent is to ensure that the redundant linecard is healthy enough to take over in case a failure is encountered on the primary linecard.

To prevent repeated switching back and forth between linecard 30 and a redundant linecard, the number of switches that are allowed in a specified time window can be limited. This precludes a situation from occurring where perhaps both linecards are faulty, in which case linecard 30 (in response to identifying a potential problem) automatically switches to the redundant linecard, which (in response to identifying a potential problem) automatically switches back to linecard 30. This situation can also be addressed using manual switchovers instead of automatic ones.

Some network devices have online diagnostic capabilities. In such devices, diagnostic tests can be executed in order to monitor the health of the devices 31-34 in the data path of linecard 30. Accordingly, in response to identifying that there is a potential problem on the data path of linecard 30, such diagnostic tests can be performed (or the results of previous diagnostic tests reviewed) to determine if any of the devices 31-34 are not functioning properly. If the diagnostic tests indicate that a device on the data path is not functioning properly, an attempt can be made to reset that device before linecard 30 is taken out-of-service. Thus, in general, the features of the present invention can be integrated with online diagnostic capabilities to avoid precipitative and perhaps unnecessary corrective actions. Note that, in network devices that support hot standby operation, it may be simpler to make the switch to the redundant card without benefit of the diagnostic tests.

Figure 4:
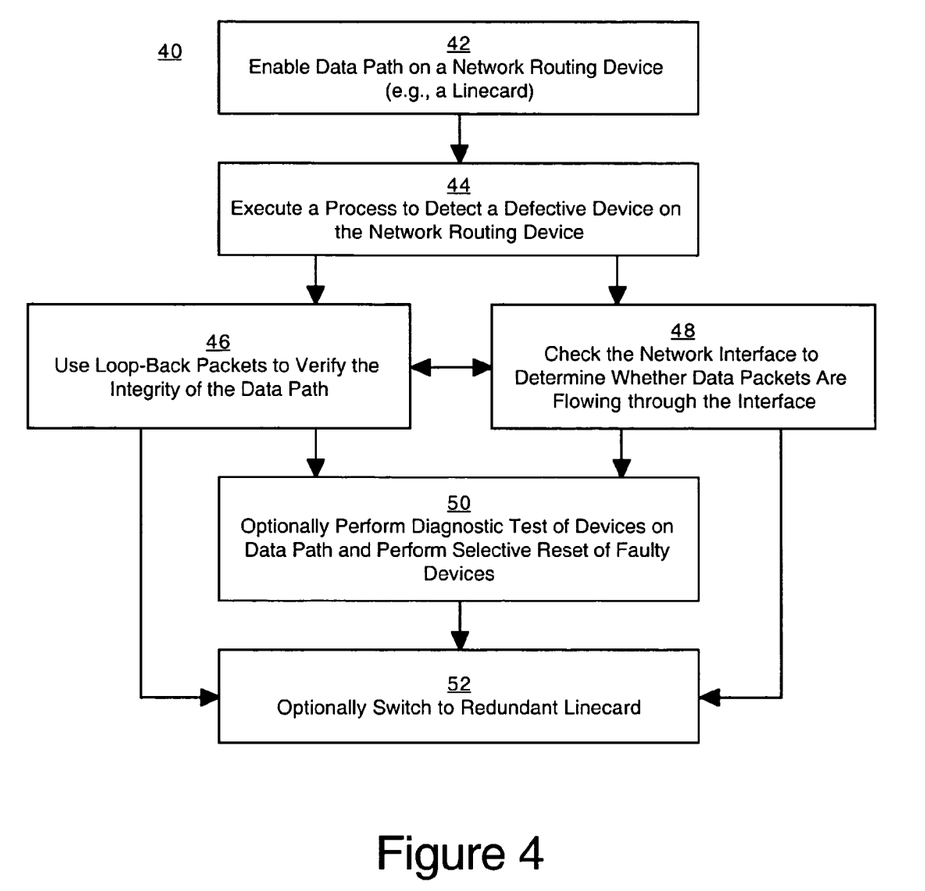
FIG. 4 is a flowchart of a process for monitoring a network routing device (e.g., a linecard) according to one embodiment of the present invention.

FIG. 4 is a flowchart of a process for monitoring a network routing device (e.g., a linecard) according to one embodiment of the present invention. Although specific steps are disclosed in flowchart 40, such steps are exemplary. That is, embodiments of the present invention are well suited to performing various other (additional) steps or variations of the steps recited in flowchart 40. It is appreciated that the steps in flowchart 40 may be performed in an order different than presented, and that not all of the steps in flowchart 40 may be performed.

In step 42, in the present embodiment, a data path is enabled on a network routing device (e.g., a linecard). As mentioned above, and as known in the art, a data path (or plane) is distinguishable from a control path (or plane) on a linecard, in both form and function.

In step 44, in the present embodiment, a process is executed to detect a defect in a device on the data path of the linecard.

In step 46, in one embodiment, the process uses loop-back packets to verify the integrity of the data path on the linecard and, conversely, to identify whether there is a potential problem on the data path, as previously described herein.

In step 48, in one embodiment, the process checks flow through (in and out of) the network interface coupled to the linecard to identify whether there is a potential problem on the data path, as previously described herein.

In yet another embodiment, both steps 46 and 48 are performed, so that one approach can be used to verify the results from the other approach.

In step 50, in one embodiment, online diagnostic tests of the devices on the data path are performed. The results of the diagnostic tests can be used to verify that there is a problem on the data path, and can also be used to pinpoint which device on the data path is the cause of the problem. A device identified as being faulty can optionally be reset, facilitating recovery.

In step 52, in one embodiment, if a potential problem in the data path on the active linecard is identified, then a switch is made to another (redundant) line card.

In summary, embodiments of the invention provide methods and systems that can more quickly identify a problem in the data plane of a routing device. Also, the source of the problem can be quickly detected and localized, facilitating troubleshooting and recovery. Overall, the availability of routing devices (e.g., linecards), network devices (e.g., routers and switches), and the network itself, are increased.

Embodiments of the present invention are thus described. While the present invention has been described in particular embodiments, it should be appreciated that the present invention should not be construed as limited by such embodiments, but rather construed according to the below claims.

What is claimed is:

1. A method of monitoring a network device, said method comprising:
   enabling a data path within said network device, said data path comprising a plurality of elements on a linecard in said network device and an interface in said network device, wherein data packets are moved on said data path using said plurality of elements and communicated to and from the linecard via said interface; and
   executing a process within said network device for detecting a defective element in said plurality of elements, wherein said process is executed within said data path allowing a defect in said data path to be detected, localized and recovered from.

2. The method of claim 1 wherein said process comprises:
   inserting a loop-back packet into a channel having a source and a destination, wherein the destination for said loop-back packet is the same as the source of said loop-back packet causing said loop-back packet to travel from said source and back to said source through said plurality of elements on the linecard in said network device; and
   detecting whether said loop-back packet is received back at said source.

3. The method of claim 2 wherein said channel is dedicated to carrying said loop-back packet.

4. The method of claim 2 further comprising:
   inserting into said channel a plurality of loop-back packets at periodic intervals; and
   identifying a potential defect on said network device when a difference between a number of loop-back packets inserted and a number of loop-back packets received at said source exceeds a threshold.

5. The method of claim 4 further comprising, in response to said identifying of said potential defect, determining whether said data packets are flowing through said interface.

6. The method of claim 1 further comprising, in response to identifying a potential defect, performing a diagnostic test of said plurality of elements on said network device.

7. The method of claim 1 further comprising switching to a redundant network device in response to identifying a potential defect.

8. The method of claim 1 wherein said process is executed before a time of reconvergence of a network.

9. The method of claim 1 further comprising switching to a redundant linecard in response to detecting said defective element.

10. A method of monitoring a network routing device, said method comprising:
    enabling a data path on said network routing device, said data path comprising a plurality of devices on said network routing device and an interface, wherein data packets are moved on said network routing device using said plurality of devices and communicated to and from a network via said interface; and
    executing a process for detecting a defective device in said plurality of devices, wherein said process is executed within said data path allowing a defect in said data path to be detected, localized and recovered, and wherein said process comprises:
    accessing information that indicates a number of data packets that are flowing through said interface; and
    identifying a potential defect on said network routing device when said information indicates that said number of data packets is not increasing.

11. A method of monitoring a network routing device, said method comprising:
    enabling a data path on said network routing device, said data path comprising a plurality of devices on said network routing device and an interface, wherein data packets are moved on said network routing device using said plurality of devices and communicated to and from a network via said interface;
    executing a process for detecting a defective device in said plurality of devices, wherein said process is executed within said data path allowing a defect in said data path to be detected, localized and recovered; and
    switching to a redundant network routing device in response to identifying a potential defect, wherein there is a limit to a number of times said switching can occur.

12. A computer-usable medium having computer-readable program code embodied therein for causing a controller to perform a method of monitoring a network device, said method comprising:
    enabling a data path on said network device, said data path comprising a plurality of elements on said network device and an interface, wherein data packets are moved on said network device using said plurality of elements and communicated to and from a network via said interface; and
    executing a process for detecting a defective element in said plurality of elements, wherein said process is executed within said data path allowing a defect in said data path to be detected, localized and recovered from before a time of reconvergence of the network.

13. The computer-usable medium of claim 12 wherein said computer-readable program code embodied therein causes said controller to perform said method further comprising:
    inserting a loop-back packet into a channel having a source and a destination, wherein the destination for said loop-back packet is the same as the source of said loop-back packet causing said loop-back packet to travel from said source and back to said source through said plurality of elements on said network device; and detecting whether said loop-back packet is received back at said source.

14. The computer-usable medium of claim 13 wherein said channel is dedicated to carrying said loop-back packet.

15. The computer-usable medium of claim 13 wherein said computer-readable program code embodied therein causes said controller to perform said method further comprising:

inserting into said channel a plurality of loop-back packets at periodic intervals; and identifying a potential defect on said network device when a difference between a number of loop-back packets inserted and a number of loop-back packets received at said source exceeds a threshold.

16. The computer-usable medium of claim 15 wherein said computer-readable program code embodied therein causes said controller to perform said method further comprising, in response to said identifying of said potential defect, determining whether said data packets are flowing through said interface.

17. The computer-usable medium of claim 12 wherein said computer-readable program code embodied therein causes said controller to perform said method further comprising:

accessing information that indicates a number of data packets that are flowing through said interface; and identifying a potential defect on said network device when said information indicates that said number of data packets is not increasing.

18. The computer-usable medium of claim 12 wherein said computer-readable program code embodied therein causes said controller to perform said method further comprising, in response to identifying a potential defect, performing a diagnostic test of said plurality of elements on said network device.

19. The computer-usable medium of claim 12 wherein said computer-readable program code embodied therein causes said controller to perform said method further comprising switching to a redundant network device in response to identifying a potential defect.

20. The computer-usable medium of claim 19 wherein there is a limit to a number of times said switching can occur.

21. A system for monitoring a network device, said system comprising:

means for moving, on said network device, data packets that are communicated to and from a linecard of said network device, said means for moving comprising a data path within said network device; and means for implementing a process for detecting a defect in said means for moving data packets, wherein said process is executed within said data path allowing said defect to be detected, localized and recovered from before a time of reconvergence of a network.

22. The system of claim 21 further comprising: means for inserting a loop-back packet into a channel having a source and a destination, wherein the destination for said loop-back packet is the same as the source of said loop-back packet causing said loop-back packet to travel from said source and back to said source via said means for moving data packets; and means for detecting whether said loop-back packet is received back at said source.

23. The system of claim 22 wherein said channel is dedicated to carrying said loop-back packet.

24. The system of claim 22 further comprising: means for inserting into said channel a plurality of loop-back packets at periodic intervals; and means for identifying a potential defect on said data path when a difference between a number of loop-back packets inserted and a number of loop-back packets received at said source exceeds a threshold.

25. The system of claim 24 further comprising means for determining, in response to said means for identifying of said potential defect, whether said data packets are flowing through said linecard.

26. The system of claim 21 further comprising:

means for reading information that indicates a number of data packets that are flowing through said linecard; and means for identifying a potential defect of said means for moving data packets when said information indicates that said number of data packets is not increasing.

27. The system of claim 21 further comprising means for performing, in response to identifying a potential defect, a diagnostic test of said means for moving data packets.

28. The system of claim 21 further comprising means for switching to a redundant network device in response to identifying a potential defect.

29. The system of claim 28 wherein there is a limit to a number of times said switching can occur.

30. The system of claim 21, where the reconvergence occurs upon a discovery of said defect through a failure to receive data packets from said network device by at least one of a plurality of other network devices in the network, and where reconvergence comprises a reconfiguring of routing tables of the plurality of other network devices.

31. A system comprising:

a network device comprising a plurality of elements on a linecard comprising a data path for moving data packets on said network device, wherein said data packets are communicated to and from a network via an interface;

a controller card in said network device having a controller coupled to the linecard; and a memory unit coupled to said controller, said memory unit containing instructions that when executed implement a process for monitoring said network device and detecting a defective element in said plurality of elements, wherein said process is executed within said plurality of elements allowing a defect in said data path to be detected, localized, and recovered before a time of reconvergence of a network.

32. The system of claim 31 wherein said process comprises:

inserting a loop-back packet into a channel having a source and a destination, wherein the destination for said loop-back packet is the same as the source of said loop-back packet causing said loop-back packet to travel from said source and back to said source through said plurality of elements on the linecard of said network device; and detecting whether said loop-back packet is received back at said source.

33. The system of claim 32 wherein said channel is dedicated to carrying said loop-back packet.

34. The system of claim 32 wherein said process further comprises:

inserting into said channel a plurality of loop-back packets at periodic intervals; and identifying a potential defect of an element on said network device when a difference between a number of loop-back packets inserted and a number of loop-back packets received at said source exceeds a threshold.

35. The system of claim 34 wherein said process further comprises, in response to said identifying of said potential defect, determining whether said data packets are flowing though said interface.

36. The system of claim 31 wherein said process comprises:
  accessing information that indicates a number of data packets that are flowing though said interface; and
  identifying a potential defect of an element on said network device when said information indicates that said number of data packets is not increasing.

37. The system of claim 31 wherein said process further comprises, in response to identifying a potential defect, performing a diagnostic test of said plurality of elements on the linecard of said network device.

38. The system of claim 31 wherein said process further comprises switching from said network device to another network device in response to identifying a potential defect.

39. The system of claim 38 wherein there is a limit to a number of times said switching can occur.

* * * * *